(12) United States Patent
Pingel

(10) Patent No.: US 8,312,766 B2
(45) Date of Patent: Nov. 20, 2012

(54) METHOD FOR ASCERTAINING THE PRESSURE AND THE PROFILE DEPTH IN A VEHICLE TIRE

(75) Inventor: Ulrich Pingel, Marl (DE)

(73) Assignee: Ventech GmbH, Marl (DE)

( * ) Notice: Subject to any disclaimer, the term of this patent is extended or adjusted under 35 U.S.C. 154(b) by 310 days.

(21) Appl. No.: 12/734,526

(22) PCT Filed: Nov. 11, 2008

(86) PCT No.: PCT/DE2008/001843
§ 371 (c)(1),
(2), (4) Date: Aug. 5, 2010

(87) PCT Pub. No.: WO2009/062475
PCT Pub. Date: May 22, 2009

(65) Prior Publication Data
US 2010/0292953 A1    Nov. 18, 2010

(30) Foreign Application Priority Data
Nov. 12, 2007   (DE) .......................... 10 2007 054 156

(51) Int. Cl.
*B60C 23/02* (2006.01)
(52) U.S. Cl. ..................................... 73/146.5
(58) Field of Classification Search .......... 73/146–146.8
See application file for complete search history.

(56) References Cited

U.S. PATENT DOCUMENTS

| | | | |
|---|---|---|---|
| 5,396,817 A | 3/1995 | Rosensweig | |
| 5,445,020 A * | 8/1995 | Rosensweig | 73/146.2 |
| 6,626,035 B1 * | 9/2003 | Dent et al. | 73/146.2 |
| 6,741,169 B2 * | 5/2004 | Magiawala et al. | 340/438 |
| 7,412,879 B2 * | 8/2008 | Serra et al. | 73/146 |
| 7,421,321 B2 * | 9/2008 | Breed et al. | 701/33.6 |
| 2008/0209995 A1 | 9/2008 | Taylor et al. | |
| 2012/0067115 A1 * | 3/2012 | Pingel | 73/146 |

FOREIGN PATENT DOCUMENTS

| | | |
|---|---|---|
| DE | 43 16 984 A1 | 8/1994 |
| WO | WO 2006/003467 A1 | 1/2006 |

* cited by examiner

*Primary Examiner* — Andre Allen
(74) *Attorney, Agent, or Firm* — Marshall & Melhorn, LLC

(57) ABSTRACT

A method for ascertaining the pressure and the profile depth in a pneumatic vehicle tire which is fitted to a vehicle, wherein the pressure is detected with the aid of an arrangement comprising load sensors, which arrangement supplies force signals for a two-dimensional pattern of the force distribution which is exerted by the vehicle tire in contact with the sensors when the vehicle moves over the arrangement, wherein the tire pressure is determined from the force distribution independently of the method of manufacture or the model of the tire and of the vehicle, is characterized in that the profile depth of the tire is determined before, while or after the pressure is determined.

19 Claims, 3 Drawing Sheets

METHOD FOR ASCERTAINING THE PRESSURE AND THE PROFILE DEPTH IN A VEHICLE TIRE

BACKGROUND OF THE INVENTION

This invention relates to a method for ascertaining the pressure and profile depth in a pneumatic vehicle tire, whereby with an array of load sensors which supplies the force signals for a two-dimensional pattern of the distribution of the force which is exerted by the vehicle tire in contact with the sensors, [the pressure] is measured when the vehicle travels over the array, and the tire pressure is determined from the force distribution independently of the type of manufacture or the model of the wheel and of the vehicles and is optionally indicated.

A method of this type for the determination of the pressure in a pneumatic vehicle tire is described in U.S. Pat. No. 5,396,817. That prior art publication describes a linear array of force sensors over which the vehicle tire rolls. The velocity can thereby be determined from the signal rise and fall as the tire runs across the load sensor array. However, the measurement of the velocity depends on the slope of the flanks of the signal for the tire pressure and is very inaccurate on account of profile factors.

However, interfering effects of the tire profile cannot be taken into consideration in this process. In particular the signal rise is significantly changed by transverse profiling of the tire, for example transverse grooves or profile grooves that run diagonally, and it can therefore be assumed that the signal rise no longer follows a linear path.

WO 2006/003467 A1, for the determination of the profile depth of a vehicle tire, describes a device and a method in which elastic means are provided so that when the tire travels over them, they are inserted into the tire profile up to a specified depth, so that they indicate, depending on whether the means inserted into the tire profile make contact with the base of the profile, whether the tire being measured has a specified minimum profile depth. The method described in this prior art document is therefore suitable only for verification of the presence of a minimum required profile depth.

DE 43 16 984 A1 relates to a method and a device for the automatic determination of the profile depth of a vehicle tire, for which purpose a triangulation unit that can travel along a measurement line is provided and by means of a measurement beam that is emitted perpendicular to the road surface measures the profile surface of a tire, the rolling direction of which is parallel to the vertical section generated by the measurement device.

The object of the invention is therefore to make available a method for the determination of the pressure and the profile depth on a pneumatic vehicle tire of a vehicle in which the influences of the tire profile can be reduced as far as possible during the pressure measurement and the tire profile can be accurately represented.

An additional object of the invention is a triangulation-based profile measurement method which also makes possible a reliable profile depth determination if the rolling direction of the tire to be measured is not aligned exactly parallel to the vertical section generated by the triangulation unit.

An additional object of the invention is a method which is less sensitive to interference from diffused or scattered light, of the type that can occur in particular if the surface of the profile is wet.

Finally, the object of the invention is also a method which, during a single pass of the tire over a device on which the method is based, makes it possible to measure the profile depth over a significant section of the circumference of the tire and over the entire width of the cover of the tire, and thus over a surface element of the profile surface.

Ultimately the triangulation-based profile depth measurement method claimed by the invention must be capable of being combined with a method for the determination of the pressure of a vehicle tire, for which purpose the problem that must be resolved is that on one hand the pressure measurement by means of load sensors must theoretically be performed on loaded vehicle tire sections, while on the other hand, as noted above, the profile depth must be measured on unloaded segments of the vehicle tire.

BRIEF SUMMARY OF THE INVENTION

The invention teaches a method with the characteristics of claim 1. Advantageous developments of the invention are the subject of the dependent claims.

The method claimed by the invention for the determination of the pressure and the profile depth on a pneumatic vehicle tire which is installed on a vehicle, whereby the pressure, by means of an array of load sensors, supplies the power signals for a two-dimensional pattern of the distribution of force which is exerted by the vehicle tires in contact with the load sensors when the vehicle is moved over the array, is determined; whereby the tire pressure is determined from the distribution of force regardless of the type of manufacture or the model of the tire and of the vehicle. The method claimed by the invention is characterized in that before, during or after the determination of the pressure, the profile depth of the tire is determined by triangulation, whereby the triangulation is used on unloaded profile segments of the tire, and for that purpose the incident angle of a measurement beam strikes the unloaded tire profile at an angle of less than 90° with respect to a road surface. It may also be appropriate to provide a device for the display of the pressure.

The array of load sensors preferably comprises at least two series of load sensors which are arranged one behind the other in the direction of travel, whereby at least one row of the load sensors is/are offset in relation to one or more rows of load sensors by a predetermined distance at a right angle to the direction of travel. Basically, however, any other pressure measurement method can also be used.

The invention also teaches that the profile depth of the tire is measured during or after the determination of the pressure.

The tire pressure and the profile depth are measured in stations that are arranged one after the other.

For the tire pressure measurement, the specified dimension should be less than the dimension of one load sensor at a right angle to the direction of travel. Generally, identical load sensors in a row are used.

In at least one of the rows of load sensors, the length of the load sensors can also be greater than in at least one additional row of load sensors. A short load sensor thereby reduces the amount of compensation effort that must be expended when a high tire pressure is present at the same time as a low load. The transverse grooves are better measured with a long sensor.

Overall it is advantageous to provide a plurality of rows with relatively short load sensors, although the number of load sensors required and the associated costs are thereby increased. However, more usable information is also obtained.

The measurement principle claimed by the invention, in physical terms, is a compromise between the longest possible sensor surface, which is desirable because it minimizes profile influences, and the shortest possible sensor surface. The contact length of the tire in the longitudinal direction with high air pressure and a low load is only very short. If the contact length is shorter than the length of the sensor surface, if no additional compensation is performed, results in significant measuring errors. That significantly limits the possible range for the sensor length.

The individual sensor surfaces should lie as close as possible to one another, preferably both in the direction of travel as well as at a right angle to the direction of travel, edge to edge.

As a result of the offset arrangement of the sensor elements, the individual sensor surfaces can also be made wider than the actual distance between sensors at a right angle to the direction of travel, although without significantly reducing the spatial resolution.

Overall, the disruptive influences of longitudinal grooves in the profile can be reliably minimized, because the effect caused by the longitudinal grooves can be eliminated. To that end, a widespread coverage with load sensors is optimal, because then a longitudinal groove will be detected in any case.

A computer unit is advantageously provided which calculates the center of gravity for signals from a first series of load sensors and for sensors from a second series of load sensors according to the equation $$p_t = \frac{\sum (I_p \cdot p)}{\sum I_p}$$

where $I_p$ is the intensity at the location p and the center of gravity $p_t$ is passed through at the time t, and from the difference between the center of gravity $p_{t2}$ of the second row of load sensors and the center of gravity $p_{t1}$ of the first row of load sensors, the velocity v is determined according to $$v = \frac{p_{t2} - p_{t1}}{t_2 - t_1}$$

The velocity of the vehicle and its acceleration can thereby be calculated with great accuracy from the time difference of the signals from the two rows.

It is thereby preferable for the load sensors to be read simultaneously or quasi-simultaneously. In the quasi-simultaneous method, the data are read in so quickly that there are no significant delays or measurement errors, or corresponding corrective measures are taken.

The exact contact length of the tire on each sensor length can be calculated using the velocity information by converting the force signal into units of length and subtracting the sensor length. In the event that the contact length is less than the sensor length or falls within the range of the sensor length, it is appropriate to perform a compensation calculation. A linear compensation will thereby suffice in many cases.

It should be noted that the velocity measurement is not absolutely necessary for the determination of the tire pressure. It can also be performed independently. In the method claimed by the invention for the determination of the velocity, the influences of profile, toe and camber are reduced.

Profile effects can be visualized and taken into consideration by means of differential consideration of the rising flank of the signals in particular.

In particular with the typical conical profile incision, the profile depth leaves behind a characteristic signal. At a greater profile depth, the profile grooves are very deep and wide and leave behind a high signal level in the transverse direction as well as in the longitudinal direction. As the profile depth decreases, the profile groove also becomes narrower, which reduces the signal amplitude. The profile depth can be easily derived from the signal amplitude. The method claimed by the invention therefore provides that when the amplitude of the force signals in the direction of travel and/or at a right angle to the direction of travel is used, a computer unit determines the profile depth of the tire.

An additional functionality of the method is the measurement of the weight of the vehicle. The load that each individual tire must support can be determined by the integration of the measured tire pressures over the distance traveled and the width of the tire. The axle weight or the total weight of the vehicle is determined by adding up the loads of the individual tires of the axis or of the vehicle.

A simple type of installation for the method is the direct installation on the road surface, generally protected by an on and off ramp. This mode of installation can be performed quickly and easily, although it has disadvantages that are caused by the vertical acceleration of the axle. In particular, sudden load changes can occur or the axle can jump over part of the sensor and lead—in addition to increased loads and wear on the sensor plates—to increased measurement deviations.

Particularly high accuracy and a minimization of the load of the measurement method can be achieved by recessing the sensor plates into the ground so that the surface is flush with the road surface and the vehicle axle is not required to execute any vertical movement caused by a ramp or similar structure and there are no disruptive vibrations of the tire or the axle.

The invention is a combination of tire pressure measurement and profile depth measurement, which measurements preferably occur one after the other as the vehicle travels over measurement stations. In this case the tire pressure, for example, is measured by the method described above. The profile depth is measured by a scanning or optical method. Examples are the light section or laser-light section methods.

The profile depth is preferably determined by means of triangulation. For example, a laser triangulation method for the determination of the profile depth is particularly well suited for, among other things, the measurement of the unloaded profile. That is basically already the case because in the method claimed by the invention, the tire profile is illuminated at measurement beam angles of incidence of less than 90° with respect to the road surface, whereby the measurement of the tire profile always takes place when the tire is at a certain distance from the measurement device, and the loaded profile section defined by the tire footprint is never used for the determination of the profile depth. In the measurement method claimed by the invention, therefore, the unloaded profile is always measured which, compared to the loaded profile, does not experience any distortion, as a result of which the use of the triangulation method in these areas does not result in any distortion of the measured values.

The profile depth can also be determined by means of a light-shadow transition or a normal light source via triangulation.

Preferably a triangulation measurement method of this type can also have a suitable synchronization of the shutter speed of a camera that detects the reflected signal and the activation time of the light source, such as a laser, for example, so that the camera measures essentially only the intensity of the light source, whereby interfering background light such as sunlight or reflected light can be largely excluded in this method.

The triangulation should be performed at an angle of less than 90° with respect to the tire surface. In the event of a potentially wet tire surface, such an angle prevents the occurrence of reflections in the camera that can severely interfere with the measurement. A triangulation measurement from a relatively flat angle eliminates this interfering reflective effect.

Because with the triangulation measurement, the determination of profile depth always takes place in only a small area of the circumference of the tire, a plurality of measurements of the same tire one after the other, for example even on different days, can be used for a qualification of the complete circumference of a tire.

Wear marks that are normally present on a vehicle tire are another source of measurement errors. In this case it is effective to use two laser beams to detect and prevent measurement errors on the wear marks of a tire. As an alternative, a plurality of measurements can be performed.

To make possible the complete qualification of the complete circumferential area of the tire by means of partial measurements performed one immediately after another, the invention also teaches the integration of the triangulation measurement method described above into a tire test bench for the determination of the profile depth. As a result, the tire can be thoroughly measured over its entire circumference with regard to different profile characteristics such as profile depth or profile defects.

It can also be advantageous to integrate a triangulation measurement device as claimed by the invention, for installation on the road surface and to integrate the triangulation measurement device, for its own protection, into an on or off ramp or into an overpass ramp.

BRIEF DESCRIPTION OF THE DRAWINGS

The invention is explained in greater detail below with reference to the accompanying drawing in which.

DETAILED DESCRIPTION OF THE INVENTION

In the figures, the direction of travel is indicated by the arrow A. A first row 10 of load sensors, e.g. 1, 3, 5 . . . is offset in relation to a second row 20 of load sensors, e.g. 2, 4, 6 . . . by an amount x at a right angle to the direction of travel. The skew produced by the velocity of the vehicle as the tire makes contact with the two rows 10, 20 can be used to determine this velocity. The advantage of this method lies in the fact that the required number of sensors in a row is only the number required in the prior art, with the additional advantage of the availability of the velocity information. The load sensors are not connected in electrical series, but are read simultaneously or at least simultaneously in terms of the data processing.

The sensor surfaces must be at a sufficient distance from one another so that they do not overlap one another. Narrow gaps between the sensor surfaces thereby remain unmeasured.

The offset arrangement allows the individual sensor surfaces to be lengthened or widened up to twice the distance between the load sensors. As a result, the interfering influence of the tire profile can be significantly reduced without significant losses in resolution.

Figure 1:
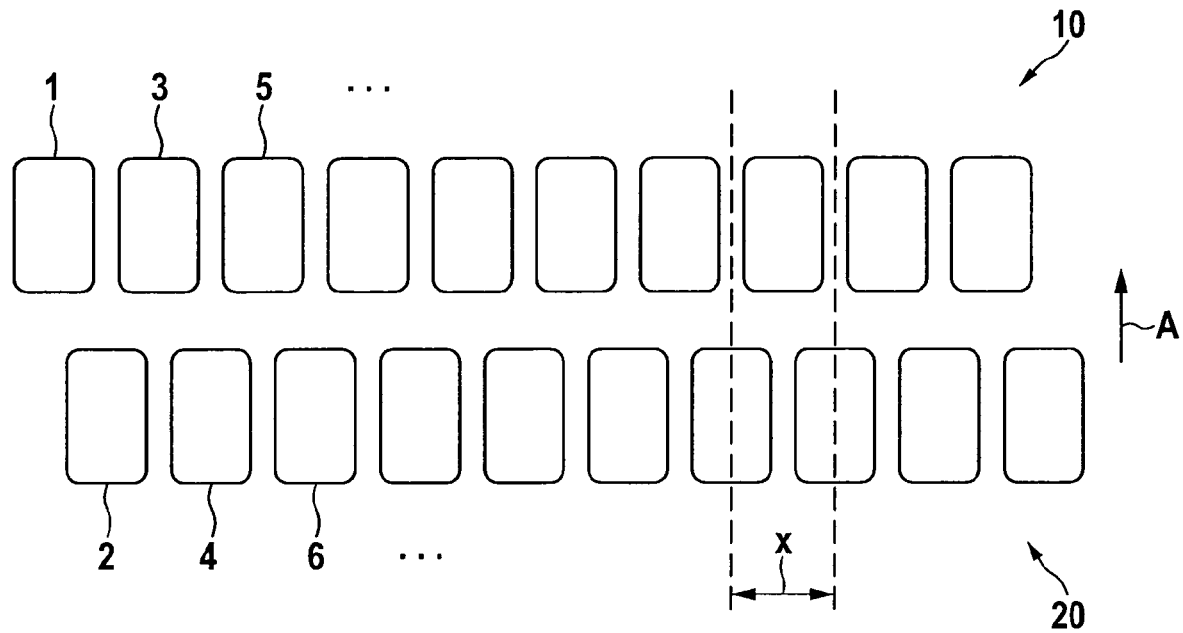
FIG. 1 is a first example of an array of load sensors in which load sensors of a first row are offset from the load sensors of a second row in the direction of travel A of a vehicle.
Figure 2:
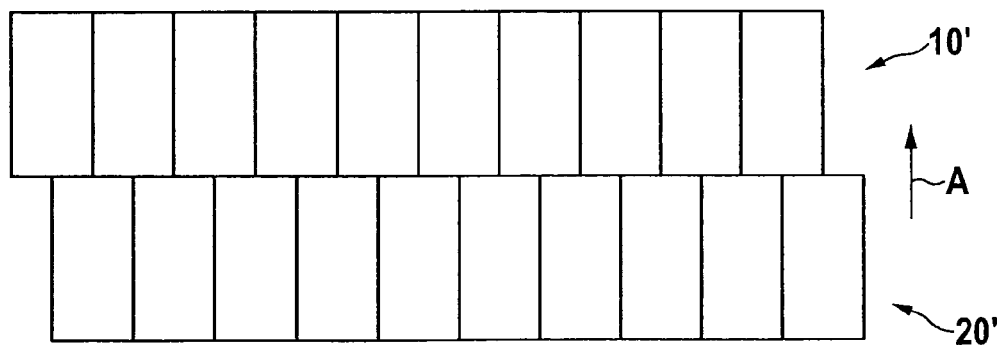
FIG. 2 is a second example of an array of load sensors.

FIG. 2 shows an example of an array of two rows 10', 20' of load sensors which are arranged contiguously end to end and side to side both in the direction of travel A and at a right angle to the direction of travel. The narrow gaps that are present in the embodiment illustrated in FIG. 1 are thereby completely eliminated, and the influence of longitudinal grooves can be measured and optionally compensated for.

Figure 3:
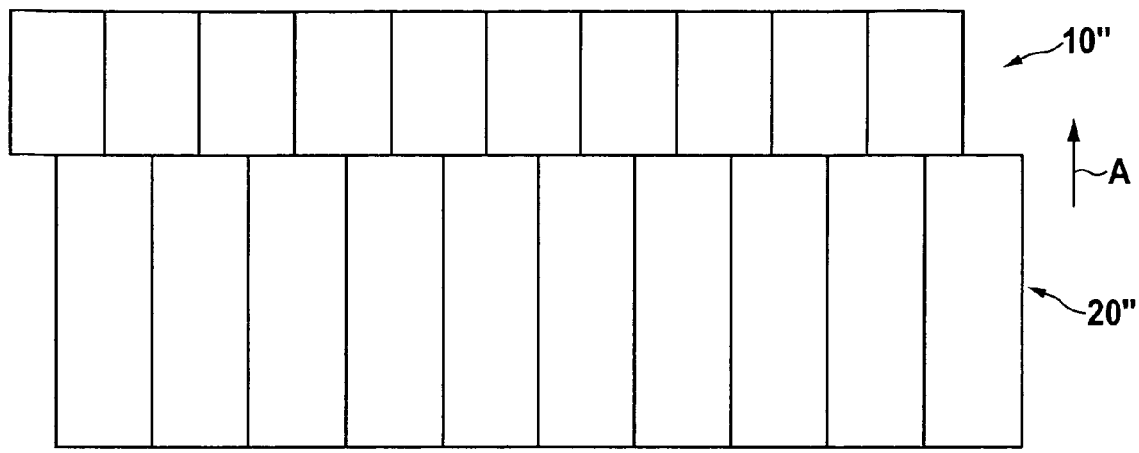
FIG. 3 is a third example of an array of load sensors.

FIG. 3 shows an example of an array of load sensors in which a first row 10" of the load sensors and a second row 20" of the load sensors have different sensor lengths in the direction of travel. The influence of the profile can be significantly reduced by this arrangement, and the actual contact length of a tire with a low load and high pressure can be determined accurately.

Figure 4:
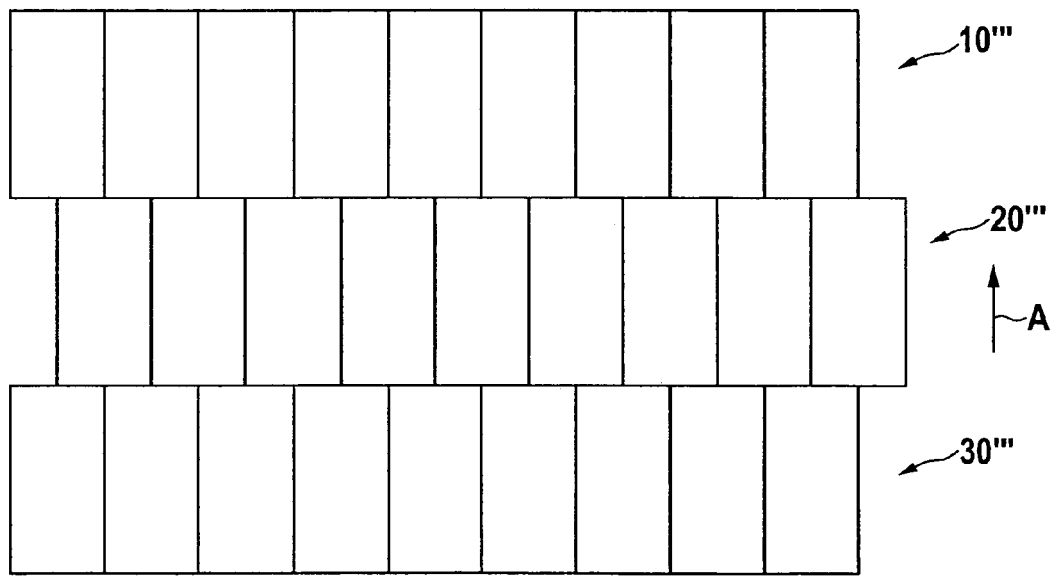
FIG. 4 is a fourth example of an array of load sensors.

FIG. 4 shows an example of an array of load sensors in which three rows 10''', 20''', 30''' of load sensors that are of an equal sensor length. It is absolutely advantageous to provide two or more rows of load sensors. As a result of the redundant information which is thereby obtained, the result is more reliable. However, an array of this type would be correspondingly more expensive.

Additional variants of the arrays of load sensors are possible. If redundant information is required, four or more rows of load sensors can even be provided, in which case the sensor lengths in the individual rows can be the same or different. The drawings show only two rows which are offset from each other by one-half a sensor width, although other types of offset are possible, such as, for example, by one-quarter of the sensor width or any other fraction of the sensor width.

Figure 5:
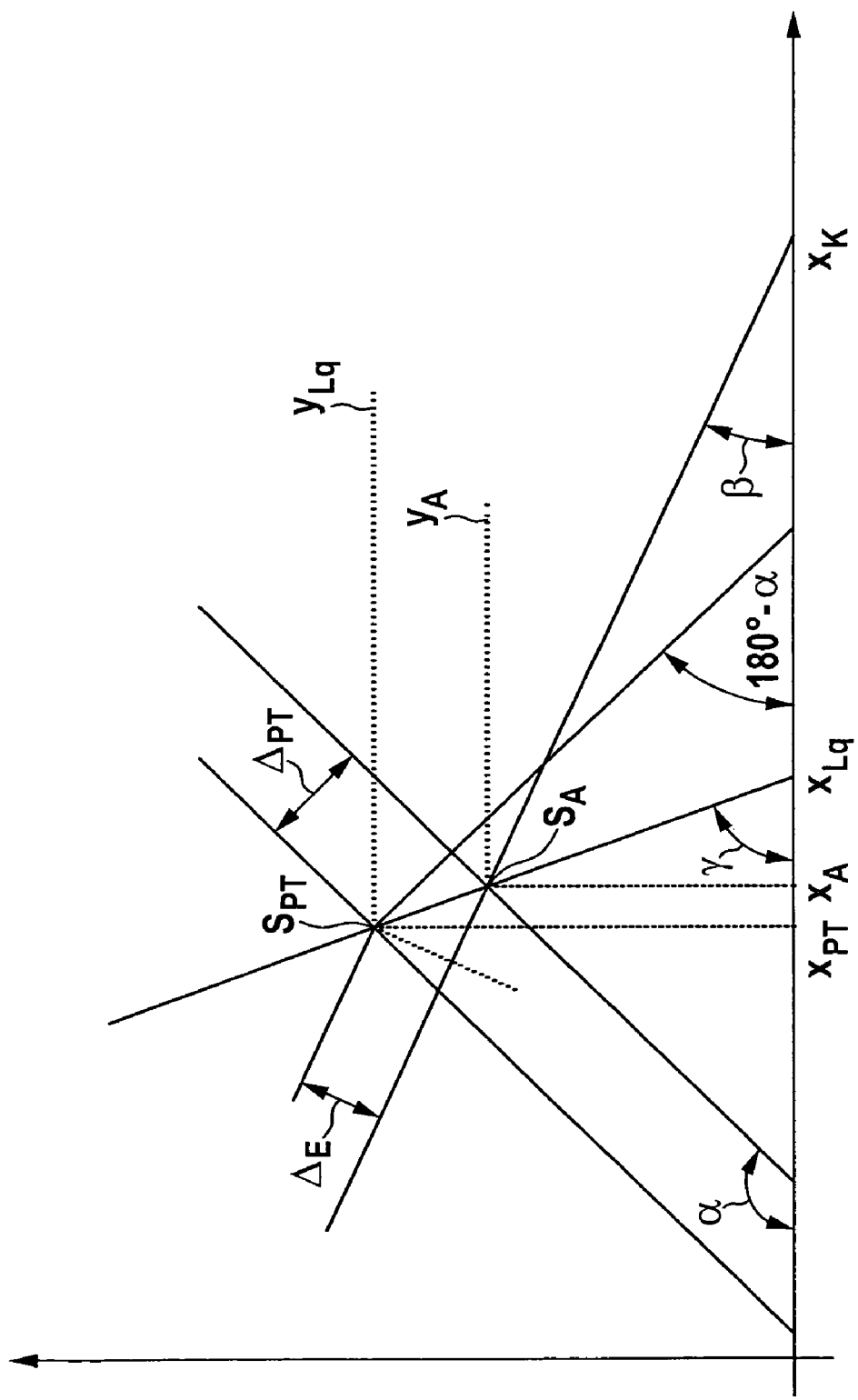
FIG. 5 is an example of a distance measurement by means of laser triangulation to determine the profile depth of a tire.

FIG. 5 shows an example of a distance measurement by means of laser triangulation which is used for the determination of the profile depth. In FIG. 5,

| | |
|---|---|
| $\Delta_{PT}$ | Profile depth to be measured |
| $r_A$ | Outside radius of tire |
| $x_{Lq}$ | Horizontal distance of the light source (lasers) from the contact point of the tire on the surface |
| $\alpha$ | Tangential angle |
| $\beta$ | Camera angle |
| $\gamma$ | Laser angle |
| $x_K$ | Horizontal distance of the camera from the contact point of the tire |
| $S_A = (x_A/y_A)$ | Measurement point on the contact surface of the tire |
| $S_{PT} = x_{PT}/y_{PT}$ | Measurement point in the profile groove of the tire |
| $\Delta_E$ | Resulting offset in the plane of the object |

The camera looks toward the object to be measured from the point $(x_K/0)$ at the angle $\beta$ and the light source from the point $(x_{Lq}/0)$ at the angle $\gamma$.

The distance $\Delta_E$ in the object plane results in a distance $\Delta_{Pix}$ in the image plane. The distances are proportional to one another (intercept theorems). By means of the evaluation of the path difference $\Delta_{Pix}$ and $\Delta_E$, the distance $\Delta_{PT}$ can be determined as follows:

$$\Delta_{PT} = \frac{\Delta_E \cdot \cos(\gamma - (180° - \alpha))}{\sin(\gamma - \beta)}$$

The conversion from $\Delta_{Pix}$ to $\Delta_E$ is done by means of the lens focal length used and the pixel spacing.

The characteristics of the invention disclosed in the above description, in the drawing and in the claims, both individually as well as in any desired combination, can be essential for the realization of the invention.

The invention claimed is:

1. A method for the determination of the pressure and the profile depth of a pneumatic vehicle tire which is installed on a vehicle, whereby:
the pressure is determined by means of an array of load sensors which supply force signals for a two-dimensional pattern of the fore distribution which is exerted by the vehicle tires in contact with the sensors when the vehicle moves over the array, whereby the tire pressure is determined from the distribution of force independently of the type of manufacture or the model of the tire and of the vehicle, wherein before, during or after the determination of the pressure, the profile depth of the tire is determined by triangulation, whereby the triangulation is used on unloaded profile sections of the tire, and for this purpose the angle of incidence of a measurement beam striking the unloaded tire profile is an angle of less than 90° with respect to a road surface.

2. The method as claimed in claim 1, wherein the profile depth is determined by triangulation by means of a laser, a light-shadow transition or a standard light source.

3. The method as claimed in claim 1, wherein for the blocking of background light, the shutter speed of a camera and the activation time of a light source such as a laser, for example, are synchronized so that the camera measures essentially only the intensity of the light source.

4. The method as claimed in claim 2, wherein the triangulation is performed at an angle of less than 90° with respect to the tire surface.

5. The method as claimed in claim 1, wherein the multiple measurements of the same tire are used for a qualification of the entire circumference of the tire and/or for the elimination of the effects of wear marks.

6. The method as claimed in claim 3, wherein the measurements are performed with at least two laser beams.

7. The method as claimed in claim 2, wherein multiple measurements of the same tire are used for a qualification of the complete circumference of the tire and/or for the elimination of the effects of wear marks.

8. The method as claimed in claim 3, wherein the measurements are performed with at least two laser beams.

9. The method as claimed in claim 1, wherein the array of load sensors comprises at least two rows of load sensors which are located one behind the other in the direction of travel, whereby at least one row of the load sensors is offset in relation to one or more rows of load sensors by a specified distance at a right angle to the direction of travel.

10. The method as claimed in claim 9, wherein the specified distance is smaller than the dimension of a load sensor at a right angle to the direction of travel.

11. The method as claimed in claim 9, wherein in at least one of the rows of load sensors, the length of the load sensors is greater than in at least one other row of load sensors.

12. The method as claimed in claim 9, wherein the load sensors are read simultaneously or quasi-simultaneously.

13. The method as claimed in claim 9, wherein a computing unit is provided which converts the force signal generated by the load sensors into units of length and calculates the exact length of contact of the tire on the surface of each of the load sensors from the length of the force signal minus the length of the corresponding load sensor.

14. The method as claimed in claim 9, wherein a computing unit is provided which calculates, for signals from a first row of load sensors and for signals from a second row of load sensors, the respective center of gravity according to the following equation $$p_t = \frac{\sum (I_p \cdot p)}{\sum I_p}$$

where $I_p$ is the intensity at the location p and the center of gravity $p_t$ is crossed at the time t, and from the difference between the center of gravity $p_{t2}$ of the second row of load sensors and the center of gravity $p_{t1}$ of the first row of load sensors, the velocity v is determined according to the equation $$v = \frac{p_{t2} - p_{t1}}{t_2 - t_1}.$$

15. The method as claimed in claim 1, wherein if the contact length of the tire is less than the length of one or more of the load sensors, a compensation calculation is performed.

16. The method as claimed in claim 1, wherein a computing unit performs a differential analysis of the rising flank of the force signals to detect and compensate for profile effects of the tire.

17. The method as claimed in claim 1, wherein a computing unit determines the profile depth of the tire using the amplitude of the force signals in the direction of travel and/or at a right angle to the direction of travel.

18. The method as claimed in claim 2, wherein the method can be performed in combination with a brake test bench, whereby a direct qualification of the complete circumference of the tire with regard to profile depth and defects is possible.

19. The method as claimed in claim 2, wherein the method can be performed while the vehicle is traveling over an on and off ramp or an overpass ramp.

* * * * *